US008295989B2

(12) United States Patent
Rettger et al.

(10) Patent No.: US 8,295,989 B2
(45) Date of Patent: Oct. 23, 2012

(54) LOCAL POWER TRACKING FOR DYNAMIC POWER MANAGEMENT IN WEATHER-SENSITIVE POWER SYSTEMS

(75) Inventors: Philip Rettger, Moraga, CA (US); Marvin Keshner, Sonora, CA (US); Alexandra Katrina Pligavko, Oakland, CA (US); Jackson Moore, Oakland, CA (US); Bodo W. Littmmann, Palo Alto, CA (US)

(73) Assignee: ETM Electromatic, Inc., Newark, CA (US)

( * ) Notice: Subject to any disclaimer, the term of this patent is extended or adjusted under 35 U.S.C. 154(b) by 276 days.

(21) Appl. No.: 12/379,092

(22) Filed: Feb. 12, 2009

(65) Prior Publication Data

US 2010/0204844 A1 Aug. 12, 2010

Related U.S. Application Data

(63) Continuation-in-part of application No. 12/320,715, filed on Feb. 3, 2009.

(51) Int. Cl.
*G06F 19/00* (2011.01)

(52) U.S. Cl. .......................... 700/291; 700/295; 706/46

(58) Field of Classification Search .................. 700/291, 700/295; 706/46
See application file for complete search history.

(56) References Cited

U.S. PATENT DOCUMENTS 4,345,584 A * 8/1982 Royer .......................... 126/610
5,117,359 A * 5/1992 Eccles .............................. 702/3
6,037,758 A * 3/2000 Perez ........................... 323/268
6,106,970 A * 8/2000 Kalarney ........................ 429/96
6,512,966 B2 * 1/2003 Lof et al. ...................... 700/291
6,529,839 B1 * 3/2003 Uggerud et al. ................ 702/61
7,509,190 B2 * 3/2009 Emery et al. .................. 700/291
7,580,817 B2 * 8/2009 Bing ................................ 703/6
2002/0019758 A1 * 2/2002 Scarpelli ........................... 705/7
2003/0006613 A1 * 1/2003 Lof et al. ........................ 290/44
2005/0039787 A1 * 2/2005 Bing ............................ 136/243
2006/0208571 A1 * 9/2006 Fairlie ............................ 307/11
2007/0236187 A1 * 10/2007 Wai et al. ...................... 323/222
2008/0249665 A1 * 10/2008 Emery et al. .................. 700/291
2009/0055300 A1 * 2/2009 McDowell ...................... 705/34
2009/0146501 A1 * 6/2009 Cyrus ............................ 307/84
2010/0072818 A1 * 3/2010 Kelly ............................. 307/68
2010/0138063 A1 * 6/2010 Cardinal et al. .............. 700/291
2010/0145532 A1 * 6/2010 Gregory et al. ............... 700/286
2010/0198420 A1 * 8/2010 Rettger et al. ................ 700/291

(Continued)

OTHER PUBLICATIONS

"A Novel Simulation Method for PV Power Generation Systems using Real Weather Conditions", Park et al, Osaka University, 2001 IEEE.*

(Continued)

*Primary Examiner* — Michael D Masinick

(74) *Attorney, Agent, or Firm* — Proxigee Legal Transactions; Elizabeth Anne Nevis, Esq.

(57) ABSTRACT

A power source affected by a geographically propagating condition (e.g. a weather-related condition) is monitored to detect changes in its power output. Characteristics of the monitored changes are analyzed to detect whether the changes are being caused by a geographically-propagating condition that could affect other power sources nearby. The information obtained from the measurements is used to extrapolate impending power-output changes in the same source, in one or more other sources, or in a collection of sources subject to effects of the propagating condition. The extrapolations enable one or more power generating systems associated with the source(s) to maintain the changes in its total power output within operating requirements.

28 Claims, 8 Drawing Sheets

300
306
305
301
302
303
304
310
311
Power Out
Time
Now

U.S. PATENT DOCUMENTS

| | | | | |
|---|---|---|---|---|
| 2010/0231045 | A1 * | 9/2010 | Collins et al. | 307/47 |
| 2010/0309330 | A1 * | 12/2010 | Beck | 348/222.1 |
| 2011/0060475 | A1 * | 3/2011 | Baldwin et al. | 700/295 |
| 2011/0066299 | A1 * | 3/2011 | Gray et al. | 700/291 |
| 2011/0307109 | A1 * | 12/2011 | Sri-Jayantha | 700/291 |
| 2012/0155704 | A1 * | 6/2012 | Williams et al. | 382/103 |

OTHER PUBLICATIONS

"Green Energy Ohio" powerpoint presentation. Solar 2007, Jul. 10, 2007.*

"An Operating Method Using Prediction of Photovoltaic Power for a Photovoltaic-Diesel Hybrid Power Generation System", Yamamoto et al, Kobe University, Japan, 2005.*

"Stability and Power Quality Issues in Microgrids Under Weather Disturbances", Rikos et al, IEEE Journal of Selected Topics in Applied Earth Observations and Remote Sensing, vol. 1, No. 3, Sep. 2008.*

Teschke, G., et al., Wavelet Algorithm for the Estimation of Mixing Layer Heights With Ceilometers, Wavelet algorithm for the estimate of mixing layer heights. Proc. ILRC Delft, 2008; online: http://user.hs-nb.de/~teschke/ps/54.pdf (downloaded Nov. 24, 2008).

Relloso, S., et al., Solar Projects Analysis Using Sensol, Sener Ingenieria y Sistemas S.A., Vizcaya, Espana, online: http://www.sener.es/EPORTAL_DOCS/GENERAL/FILE-cw0bd117fad3d64a6e9638/SOLARPROJECTSANALYSISUSINGSENSOL.pdf (downloaded Nov. 12, 2008).

Sandia National Laboratories, Solar Energy Grid Integration Systems "SEGIS", U.S. Dept. of Energy Program Concept Paper Oct. 2007, online: http://www.sandia.gov/SAI/files/SEGIS%20Concept%20Paper-071025.pdf (downloaded Feb. 2008).

* cited by examiner

LOCAL POWER TRACKING FOR DYNAMIC POWER MANAGEMENT IN WEATHER-SENSITIVE POWER SYSTEMS

CROSS-REFERENCE TO RELATED APPLICATIONS

The present application is a continuation-in-part of U.S. application Ser. No. 12/320,715, filed Feb. 3, 2009, titled, "Dynamic Management of Power Production in a Power System Subject to Weather-Related Factors".

BACKGROUND

1. Field

This disclosure relates to the operation of power systems using solar energy, such as solar farms using photovoltaic or solar-thermal technology, as well as other weather-dependent energy sources. In particular, it concerns applications using measurements to predict meteorological conditions in order to estimate power production and control power generation or delivery.

2. Background

Utilities want and need predictable, stable power generation. End-use devices function best with a steady flow of electricity. The components of the grid system (wires, transformers, etc.) are most reliable when the flow of power is constant, or at least varies slowly and predictably.

Grid operation requires that the supply and demand of electricity be matched at all hours. During normal operation, utilities use power plants in 'regulation' mode to match moment-to-moment changes in load and intermittent power production and 'load following' to match changes in power as the power demand goes through normal daily load fluctuations. Under contingency operations (for example, when a power plant or transmission line is unexpectedly out-of-service), additional "spinning reserve" and "non-spinning reserve" resources are engaged to maintain grid reliability. Fossil fuel power plants, hydropower plants, power storage facilities, and customer load reductions all provide these services to the grid.

Different power plants have different operating ranges, time response periods and cost-to-respond profiles, and have different roles within grid operations. Some can be started very quickly, such as hydroelectric power plants. Others take longer to ramp up to full production, such as natural-gas-powered turbines. Still others take even longer to increase power production, such as coal-fired plants. If a major power production facility goes off-line or significantly reduces its electricity production, or if load demand increases more significantly than expected, the utilities must respond by starting up an alternative source quickly enough to prevent loss of power for end users.

Intermittent resources significantly impact the electrical grid because fluctuations in power from intermittent resources such as solar and wind occur during normal operation. The utility industry is beginning to deploy large-scale solar farms, producing 10 MW or more power from a single geographic location. Solar power systems produce electrical power as a function of the amount of light, referred to as insolation or irradiance, incident on the component solar panels. The irradiance affects various factors in the generation of electricity from a solar power system. If the solar power system provides a significant fraction of power to a grid operating area or section of the grid, changes in irradiance can have a significant impact on the stability of the power on the grid. The power production from solar farms is very predictable during fair weather because the ramp-up at sunrise and the ramp-down at sunset can be predicted from almanac data, and is suitably gradual that backup sources can be phased in and out at a reasonable rate. Also, on dense overcast days, the power production can drop down to 10% of the clear sky power production, although the variation in solar production over short durations is not as significant.

Non-grid-connected systems that deliver power directly to end users also need to be stable because electrical equipment can malfunction or even be damaged by a fluctuating supply of power.

Technology exists for tracking major storms, and the corresponding effect on power output from a solar farm in the storm path should be easy to predict; however, the effects of other weather conditions, such as the passage of broken clouds, are presently very difficult to predict or compensate. On partly cloudy days, a solar photovoltaic farm will alternate between full production and 10% power production with ramp times down to seconds or minutes. These ramp times are too short for most common grid backup sources to be brought online from a "cold" start. In a smaller control area, there may not be enough regulation or quick changing generation to compensate. Solar thermal systems have an inherent thermal inertia that causes them to react more slowly to irradiance changes than solar photovoltaic systems; however, intermittent shading by patchy clouds can cause unacceptable instabilities in power output for these systems too.

As indicated above, forecasting is used to increase predictability in power fluctuation. Given the forecasts of load demand and intermittent production, the grid operator may start additional power plants and operate the same or other power plants at less than full capacity such that there is sufficient system flexibility to respond to fluctuations. As a result, some grid operators are currently using centralized weather forecasting to predict power output of both wind and solar facilities. In addition, if forecasting information was readily available to operators of non-grid-connected solar and wind systems, the operators could also timely activate backup sources to prevent power interruptions, or reschedule their use of sensitive equipment.

Localized differences in wind speed due to different ground levels or obstructions will affect ambient and solar panel temperature. With changes in temperature, the output power from solar panels will change even if the irradiance does not change. Thus, local landscape features can cause different panels or arrays to produce differing power outputs at any given time.

Even if the terrain is perfectly featureless, as in some plains regions, broken or moving cloud patterns can affect the power outputs and operating factors, such as Maximum Power Point (MPP) of the PV panels below. The more area that a solar farm installation covers, the more opportunities for shifting cloud patterns or fog patches to decrease the power production in a part of a solar farm. Therefore, even with several sensors of sunlight intensity distributed across the area of the solar farm, it is difficult to accurately predict the total power that will be produced by the solar farm in the next few minutes.

A cloud passing over a part of a solar farm can quickly reduce the power generation of that part from maximum to less than 10% of maximum. A transmission grid may be limited in the amount of intermittent power generation that can be interconnected and operated using current technology while maintaining North American Electric Reliability Council (NERC) reliability requirements. Also, in accordance with NERC reliability requirements, each transmission grid operating area (balancing area) is required to identify any power exchange with other balancing areas in advance and then operate their system to strictly adhere to those schedules. Based on the power plants' storage and load response available within a balancing area, the transmission grid has a limit to the amount of load fluctuation and intermittency the system can respond to and still meet reliability requirements. Depending on these factors, sometimes a new solar farm with its natural fluctuations can be accommodated with or without forecasting and advanced utility actions. In other cases, due to these factors and other intermittent generation effects, new solar farms' natural fluctuations cannot be accommodated by the existing grid.

FIG. 1 is a diagram of a large solar installation with varying conditions for different arrays and groups of arrays within a particular geographical area. Depicted is a varied terrain, symbolically represented by line 111, with a number of solar arrays 115*a-f* incorporated into a distributed power system. In addition, solar panels provided on buildings 121 can also be incorporated into the distributed power system. As depicted, local conditions may affect irradiation onto the solar panels both in gross and as individual segments. Clouds are significant because they cause substantial variability in the irradiance, including local variations on any solar panels they shade.

Depicted in FIG. 1 are substantially thick clouds 141, thin cloud layers 145, and cloud patterns 149 with convective activity. As indicated by the dotted lines, the clouds create shading patterns consistent with their total density and the solar incidence angle. A thicker cloud layer would cast a darker local shadow than a thin layer, but the overall effect of thicker clouds with smaller horizontal extent may be less significant than that of a thin layer with greater horizontal extent. On the other hand, there are circumstances in which substantial clouds, such as a towering cumulus cloud 149, may have no present effect at all on the photovoltaic network.

Since there is movement of the clouds, it is possible to predict the future positions of these clouds based on their current movement. Thus, if the clouds are moving to the right in the image, corresponding changes in solar irradiation can be expected. Similarly, there are circumstances in which the density of clouds will change over a time period represented by the movement. These changes can be fairly predictable, based on current meteorological conditions and historical meteorological data. Examples of meteorological conditions include effects of wind and wind direction in areas near mountain ridges, stability of the air (a function of the environmental lapse rate), and time of day. Many of these meteorological conditions interact; for example, an upslope wind in warm unstable air in the afternoon is likely to result in rapid cloud formation. As another example, the towering cumulus cloud 149 has no present effect on the photovoltaic network in FIG. 1 because it is not shading any part of the network; however, if the wind blows from the left side of the figure, it will have some effect as it passes, consistent with its size. If atmospheric conditions are sufficiently unstable, e.g., a hot and humid summer afternoon, it can also be predicted that as the cloud passes the affected area, it may develop into thunderstorm activity, with substantially wider coverage.

Utility regulation significantly affects the production of energy from intermittent resources such as solar power. Based on utility and regulatory methods, there may also be some value assigned for how reliably it can provide power when power is needed (capacity value). A dispatchable (controllable) power plant can be under contract to provide both energy and power at the same time. For example, a 100 MW turbine might produce 80 MW of power delivered to the grid to supply energy and then have an additional 20 MW which can be used to provide ancillary services. For example, with frequency regulation, the grid operator sends signals on an ongoing basis, identifying what power level between 80 MW and 100 MW to operate the turbine until the next signal is received. In spinning reserve or non-spinning reserve, the 20 MW is held in reserve and can be provided to the grid on very short notice.

As part of the agreement to connect a power plant to the transmission grid, a power plant may be required to limit changes in the total electricity production at the point of interconnecting to the grid (production ramp). Therefore, a need exists for means of stabilizing the output from intermittent sources such as solar farms.

SENER Ingenieria y Sistemas S.A., of Getxo, Spain, provides a software package called SENSOL that uses historical weather data to predict overall solar farm performance. It does not, however, address the need for solar farms to anticipate and react to rapidly changing conditions in real time. A tool that would perform this function for solar farms and the utilities they serve would be a valuable contribution to the commercialization of large-scale solar power plants at a cost that could effectively compete with less-sustainable power sources.

Planes and boats have on-board weather radar to detect local variations in weather patterns. Also, local weather stations have been deployed for specialized applications such as detecting wind shear and microbursts near airports. These forms of local weather detection have not been applied to use in the prediction of distributed power systems, and have not been used to predict the effects of cloud cover on solar farms or wind farms. More generally, previous systems have not employed local weather detection and local cloud prediction to predict power production dynamics on a moment-by-moment basis.

Solar farms and wind farms have set up local monitoring stations for resource assessment and performance supervision, but this monitoring has not included local weather detection and local cloud prediction to predict power production in real time. This type of real-time data gathering and power prediction would be valuable, especially if linked to a system that enabled corrective action to stabilize farm power output or grid power in the event of an unacceptable degree of expected fluctuation.

SUMMARY

Control is implemented in a power generation system and/or a storage system associated with the power generation system, in which the power generation system generates power from least one weather-dependent power source. Measurements are taken to obtain information regarding power output conditions. The measured information is used to analyze the future real-time meteorological effects on the power system. The analysis is in turn used to provide a control signal or indication corresponding to an anticipated change in power output.

DETAILED DESCRIPTION

Overview

Figure 1:
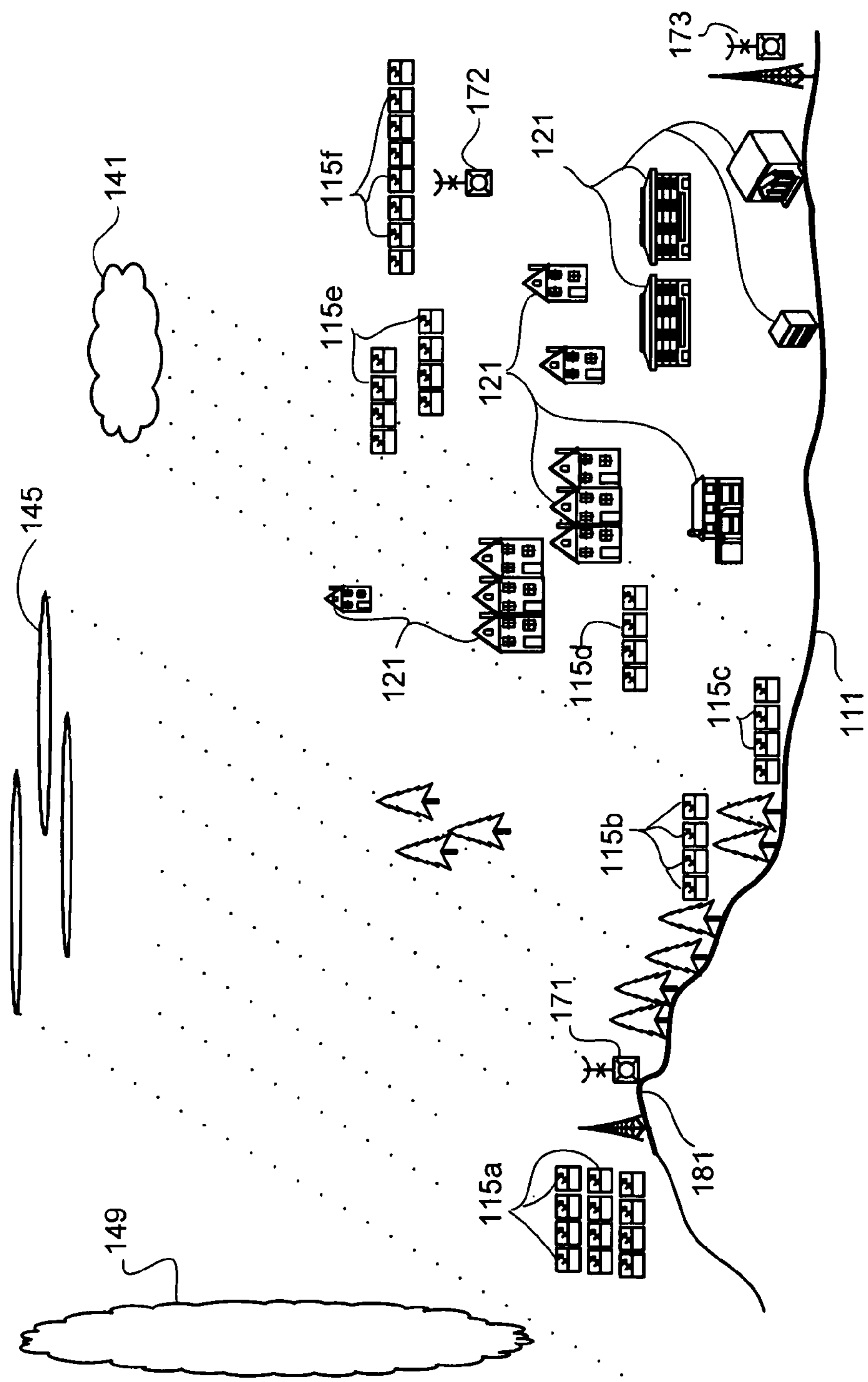
FIG. 1 is a diagram of a large solar installation with varying conditions for different arrays and groups of arrays within a particular geographical area.

As described herein, "solar farm" is intended to include a variety of configurations of a solar distributed power generation network, including arrangements of photovoltaic or solar-thermal arrays on open land, on diverse structures, such as buildings, other types of solar collectors, and combinations of these.

Direct sensing of output power fluctuations in localized parts of a geographically extended power system (for instance, fluctuations in the output power of individual PV panels, sub-arrays, arrays, or independent generating stations) can be used to predict what will occur in other parts of the system. For instance, when clouds pass over an array, they cause output power fluctuations as they shade each panel. If the power delivered by individual panels or sub-arrays at known locations is tracked over time, the speed and direction of the transient shading fluctuations can be calculated. Once the speed and direction is known, further calculations can predict which other arrays will be similarly affected, and how soon. The process of power tracking can include:

1. gathering power-change data from single power sources or co-located groups of sources,
2. determining which power changes are probably due to weather factors that will affect the power output of other power sources,
3. interpreting the data to predict the expected change in overall power station output;
4. comparing the characteristics of the expected change (e.g., amplitude, rate, timing) to a predetermined threshold based on what the connected grid can tolerate, and
3. if the expected change exceeds the threshold, responding to the interpretation to mitigate the expected fluctuations in available power to the grid. Possible responses include, but are not limited to,
   a. preemptively reducing station output to reduce the rate of change, using stored energy to reduce the rate of change,
   b. using external sources of energy or load reduction to reduce the combined rate of change on the system, or
   c. notifying the utility of the upcoming fluctuation, so that they can increase the flexibility of their system.

From measurements of the time-dependent output of a power source sensitive to a geographically propagating condition (such as a cloudbank or weather front), an expected amplitude, onset, rate of change, or duration (or combinations of these variables) of a power-output change in a downstream source can be extrapolated. If a power generating system delivers power from multiple sources through a single supply point, the extrapolations of power-output changes for separate sources can be combined on a common time axis, producing expected power-output changes at the supply point. If the expected power-output changes exceed what the supply point can easily accommodate, steps can be taken to mitigate the undesirable characteristics (e.g. excessive amplitude or excessively rapid ramp rate) before the expected power-output change actually occurs.

Weather-Related Variations in Power Station Output

Figure 2:
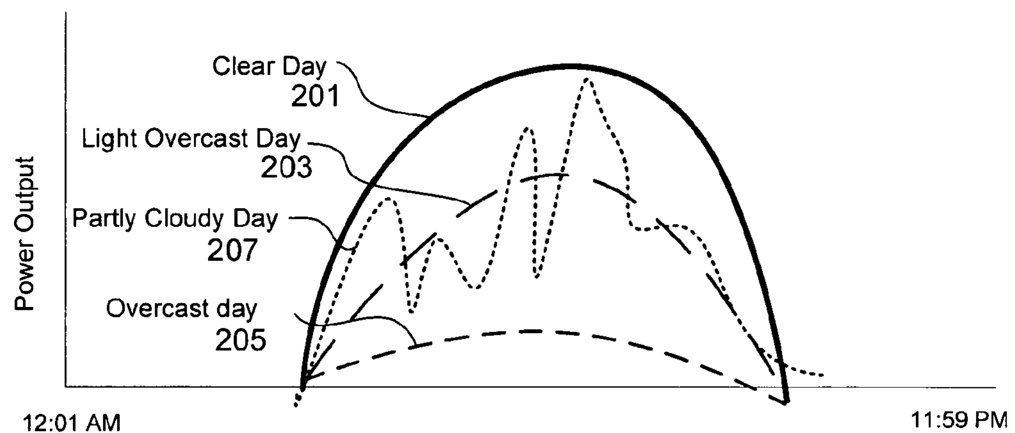
FIG. 2 is a graph showing examples of solar farm power output variations in a 24 hour period under different weather conditions.

FIG. 2 is a graphic depiction showing examples of solar farm power output variations in a 24 hour period under different weather conditions. On a clear day, irradiance tends to be consistent and predictable, as indicated by curve 201. On a day with overcast, but with constant cloud thickness, a similar predictable irradiance profile occurs, as indicated by curves 203 and 205. In the example, curve 203 represents a light overcast condition, with curve 205 representing a heavier overcast condition. On a partly cloudy day, the irradiation would vary in accordance with cloud formations passing the affected area, as indicated by curve 207. In such cases (partly cloudy days), it becomes advantageous to predict the impact of localized cloud changes because the output of a solar farm might otherwise change more rapidly than purely reactive backup systems could compensate.

Measurement of Conditions

Distributed sensors on-site at a power station can be more precise and accurate than centralized forecasting for predicting a solar farm's power production because they can provide multiple checkpoints to take account of the effects of local terrain, local wind conditions, observed convective activity, etc. This is advantageous in locations where multiple geographical features that interrupt wind currents or change the humidity content, such as mountains, rivers, bays, lakes, and volcanic-type features such as hot springs, create varied local microclimates. In such areas, cloud patterns can change significantly in the course of crossing from one microclimate to another.

When a weather-sensitive power generation system includes numerous geographically separated power sources, such as solar panels or wind turbines, the power sources themselves can be used as distributed sensors. For instance, when a cloud edge passes over a solar panel, the power output from that panel or string of panels will change. By measuring the output of the photovoltaic panels, a direct reading of irradiation is obtained. The movement of cloud cover is detected as the power output of sequential panels changes. When the power from one panel, sub-array, or array changes, that information can alert a human operator or automated control system that the power from other panels, sub-arrays, or arrays are about to experience similar changes. By consulting a look-up table of affected panels' geographical location, the speed and direction of the power changes can be mapped, and their future trajectory and arrival time at other locations predicted. Similarly, if two or more solar farms share the data, a farm that is presently undergoing power changes can alert another farm if the changes are moving in its direction so that the other farm can prepare to react to the changes.

Figure 3A:
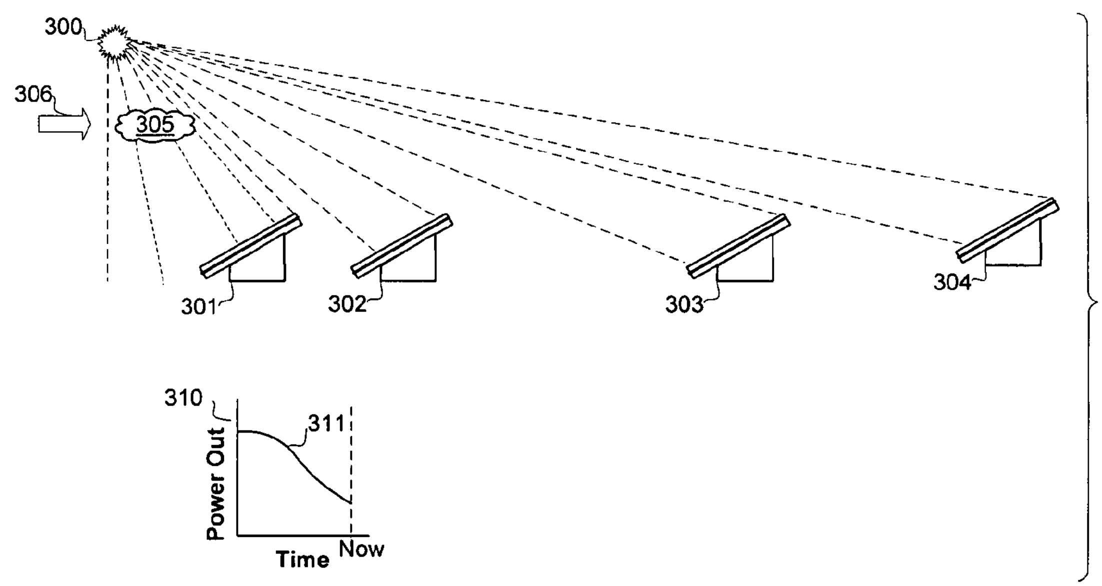
FIGS. 3A-3C conceptually illustrate a simple example of localized power tracking to extrapolate impending output-power changes in one or more power sources downstream of a geographically propagating condition.
Figure 3B:
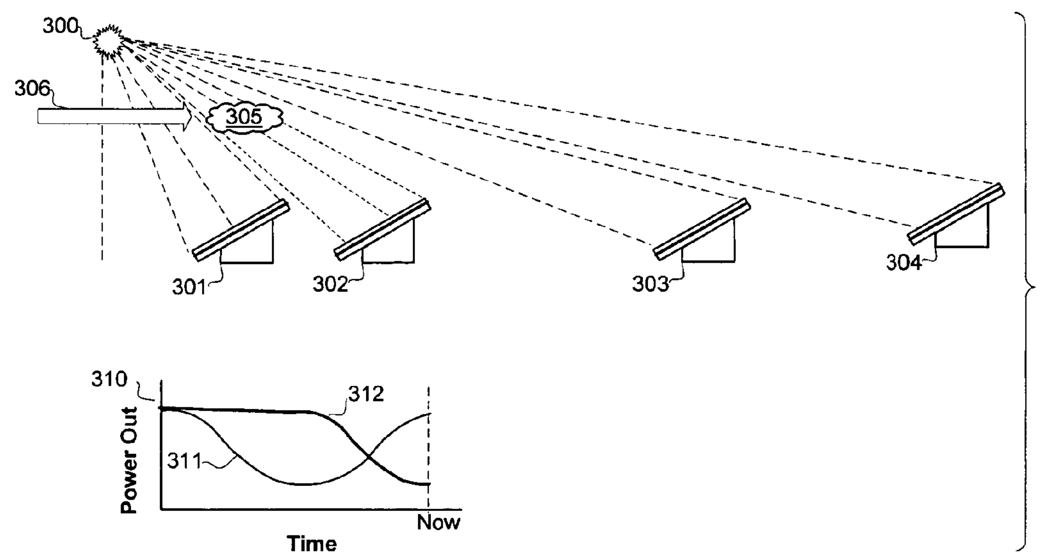
Figure 3C:
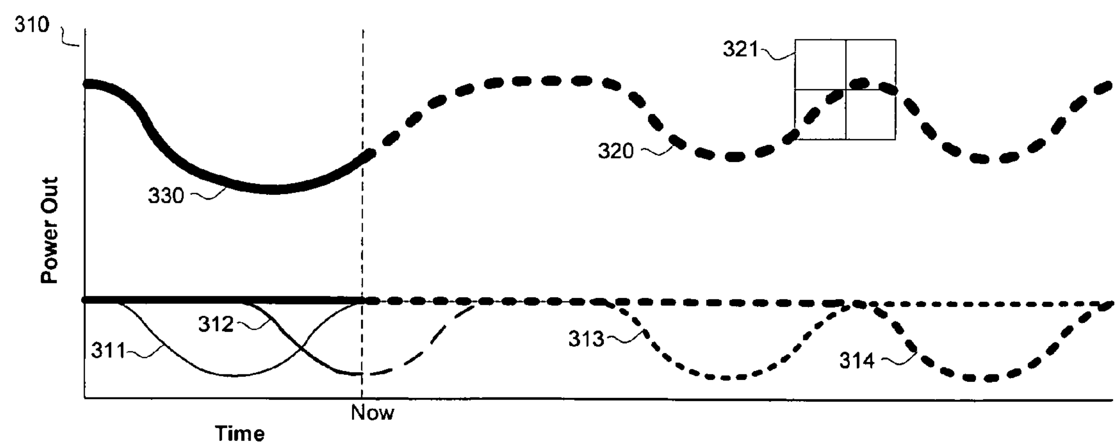

FIGS. 3A-3C conceptually illustrate a simple example of how localized power tracking can enable advance estimates of power output fluctuations from one or more power stations. In this example, sun 300 illuminates geographically separated PV sources 301,302, 303, and 304. 301-304 may, for example, represent solar modules, sub-arrays, arrays, or independently operating solar power stations.

In FIG. 3A, a cloud 305 moving in direction 306 partially shades source 301. Power tracking graph 310 monitors the change in power from source 301 and generates curve 311 from it. FIG. 3B shows a later time. Cloud 305 has continued to move in direction 306; it has stopped shading source 301 and is now shading source 302. (In this example, cloud 305 is moving rapidly enough that the position of sun 300 has not significantly changed). On graph 310, curve 311 continues to track source 301, which has now recovered its power level after cloud 305 finished passing over it. Curve 312 tracks the power from source 302.

FIG. 3C shows how the tracking system extrapolates expected power fluctuations from measurements of actual fluctuations. The tracking system "knows" the locations of sources 301, 302, 303, and 304 from stored data. The duration, and amplitude/time profile of the shading from cloud 305 is known from measured curve 311, and the speed and direction of cloud 305 is calculated by comparing curves 311 and 312. From all this, the system can extrapolate when, how much, and for how long cloud 305 will shade sources 302 (dotted continuation of curve 312), 303 (dotted curve 313), and 304 (dotted curve 314). Then, by summing the curves, the system extrapolates the expected power fluctuations of the entire system of sources 301-304 (dotted curve 320).

If sources 303 and 304 are far enough from sources 301 and 302 that the angle of the sun will change by the time cloud 305 passes over sources 303 and 304, the extrapolated timing can be corrected by retrieving stored data on the angle of the sun vs. time for that location. This highly predictable quantity can be reliably calculated from almanac-type data.

The "error box" 321 represents the limits of an acceptable amount of power change (its half-height) over a fixed time (its half-width). Such an error box can be computationally "slid" along the extrapolated system power curve 320 to determine whether the expected system power fluctuations will exceed allowable thresholds. In the figure, error box 321 is shown at a point where the expected change in power is just on the borderline. If the calculation shows that the expected power change will exceed acceptable thresholds, the system can further analyze the characteristics of the unacceptable power change, chooses an appropriate response corresponding to the analyzed characteristics from a stored selection of responses, and sends a signal that triggers the response. In some embodiments, the measured system power 330 is stored along with the corresponding extrapolated curves to generate experience-based correction factors.

In some embodiments, power tracking of localized sources included in one power generating system can detect changes propagating in the direction of another power generating system. Communication links and shared calculation and control systems can allow each system to provide early-warning estimates of expected weather-related power fluctuations in other systems. For example, suppose sources 301 and 302 were part of system A, and 303 and 304 were part of system B. A single tracking system could sum curves 311 and 312 to generate the expected System A fluctuations, extrapolate curves 313 and 314 and sum them to generated the expected System B fluctuations, threshold-check the two curves, and trigger responses for system A, system B, or both as appropriate.

A similar system could be devised where the sources are wind turbines or groups of wind turbines and the propagating effect is a change in wind characteristics. The approach could also be adapted for other geographically separated power sources with power output affected by weather or other geographically propagating effects.

Predicting the Impact of Conditions on Power Station Output

In general, weather conditions likely to propagate across the landscape and affect other localized power sources are not the only possible causes of a power change in any one localized power source. Internal malfunctions, soiling (or cleaning), or misalignment or damage from an isolated condition change (e.g. impact of a rock, subsidence of a small underlying sink-hole or animal burrow) can affect a localized power source without propagating to others. Fortunately, these occurrences are relatively rare.

Nor are all weather-related changes that can propagate to other sources as straightforward as the FIG. 3 example of a single cloud passing directly over successive sources. Clouds can also form directly above a PV source from a previously clear sky. As they form, they might or might not also move.

One solution is to combine power tracking with independent measurements and forecasts of weather factors. The system can be programmed to determine whether an observed power fluctuation is from a propagating weather condition by determining the correlation between the observed fluctuation and the type of fluctuation the measured or forecast weather factor would be expected to cause. The independent measurements can include sensing of local irradiance (e.g. using pyranometers), or sensing atmospheric conditions with instruments such as radar, LIDAR, visual sensors such as cameras, and thermal sensors. The locally sensed data may be combined with data from other sources, such as ground and satellite-based weather stations. By adding data from external weather forecasts to the predictive calculations, the system can predict whether observed clouds are likely to increase or decrease in size, density or other properties that affect their shading properties as they form or move. For example, by combining an observation of gradually decreasing power in a group of neighboring sources with a national weather-service prediction of summer afternoon thundershowers and local observation of new clouds forming, the system could more accurately predict whether and when the cloud cover is likely to affect solar power production and by how much.

Historical, Terrain, Almanac, and Model Information

Advanced embodiments of the present subject matter can "learn" from the data they have gathered in the past. Both predictions and actual results can be stored, and correction factors to enhance the accuracy of future predictions can be calculated and updated. For example referring to FIG. 1, suppose a group of medium-opacity cumulus clouds is detected passing over PV array 115*c* moving toward PV array 115*a* at 30 km/h. A straightforward calculation based on current speed and direction might predict that they would begin producing a 2% shading of 115*a* beginning in 30 minutes and ending in 60 minutes. However, if the system has stored data indicating that clouds are typically delayed and thinned by the ridge 181 lying between 115*c* and 115*a*, and statistics on typical degrees of delaying and thinning, it might correct the prediction to a 1.5% shading beginning in 45 minutes and ending at 75 minutes.

Local regions, including the locations of power stations, sometimes have special characteristics that affect incoming changes in cloud cover and other weather-related effects. Because these special characteristics are largely related to geographic features such as land contours, bodies of water, and geothermal zones, in most cases their effects on incoming weather patterns are repeatable, or at least capable of being extrapolated from previous trends. In addition, data on sun position and angle can be combined with terrain data to store predictable non-propagating effects. Again referring to FIG. 1, a system could store the typical seasonal occurrence of morning fog affecting power output schedules of low-lying arrays 115*c* and 115*b*, but not 115*a* which is higher up on the other side of ridge 181. Assuming that the left side of the figure corresponds to west, 115*b* and 115*c* would also experience earlier sunset shading than 115*a*; the system could include stored data taking account of that.

Aging of PV panels can also affect how a change in irradiance can affect power output. A system can store the ages of various PV arrays and the comparative effects of shading on the power output of differently aged panels to provide correction factors for extrapolating expected power changes.

Stored historical information can, in some situations, enable extrapolation of expected power changes for the power sources that are first affected as well as those downstream in the path of the geographically propagating condition. For example, referring back to FIGS. 3A and 3B, suppose the historical data showed that a change with a leading edge resembling that of curve 311 in FIG. 3A was usually followed by a power "trough" and trailing edge very much like the continuation of curve 311 in FIG. 3B. This would allow immediate extrapolation, at the time the leading edge characteristics are identified, of the impending changes to the power output by source 301 as well as sources 302, 303, and 304.

Enhanced embodiments of the present subject matter take advantage of stored data related to special characteristics of the power station's location and sources to enhance the accuracy of predictions. Almanacs can provide historical data on an area's high, low, and average temperatures as well as other statistics. These statistics can be factored in to calculate the likelihood that a predicted change in atmospheric conditions is accurate.

Responding to Predictions of Power Output Changes

A control system for the solar farm is able to respond to predicted changes in solar farm output. The solar farm operator may take various steps to mitigate the total fluctuation seen by the grid operator. This could include 1) proactively reducing power output at an acceptable rate before a downward trend begins, 2) controlling the upward ramp rate of power output, by limiting change of power when an upward trend begins, 3) using stored energy to limit the rate of increases or decreases in power output, 4) using backup generation resources which could produce energy to reduce the combined rate of change to target levels, 5) reducing the demand of a large energy consumer within the transmission and distribution area, to reduce the combined rate of change to target levels, and/or 6) communicating anticipated changes to a power utility or grid operator. In the case of energy storage facilities, in instances where wide fluctuations are expected during a particular time period, energy storage can be particularly useful because this allows the distributed power network to be operated at near maximum available power at any given time while providing a less dynamic or more stable output to the power grid. Actively managing the power could have various goals including: 1) reducing the change in power to within contracted or acceptable limits, 2) matching a contracted output profile, which could be in various increments including 10 minute, 15 minute, or 60 minute increments, or 3) matching a non-contracted pre-promised profile.

Control of Production From Solar Output

Proactively reducing the power output from the solar facility is implemented to prevent the facility from exceeding the grid's production ramp-rate requirements as clouds cover the facility. For example, in a photovoltaic farm, a control system that controls the inverters via a network can issue commands responsive to the gathered data. If a power plant has many inverters, the ramp rate of each inverter could be limited, or selected inverters could be turned off in stages while others continue to operate at maximum available power output. For the second case, the total power sent to the grid could be gradually ramped in either direction by sequentially switching inverters on or off. Those skilled in the art will recognize that "turning an inverter on or off" embraces other modes of activation and deactivation, such as exiting or entering a standby mode. It could also be the case that one inverter is dropping power while another inverter is increasing in power. In this case a central control system could monitor all inverters to maximize the total energy produced while still meeting maximum farm level ramp rates.

For a large farm with many inverters, a suitably gradual ramp may be achievable by selectively turning inverters on or off rather than operating them over a range of intermediate power levels to achieve a ramp in power level. Turning inverters on and off results in a ramp with "steps," rather than a smoothly varying ramp, in the total output power from the farm. If the farm has many inverters, the step height from turning any single inverter on or off will be only a small fraction of the total output power, so the non-smoothness of the ramp may be insignificant to grid stability. On the other hand, a farm with fewer inverters operating at higher power may produce a ramp with unacceptably large steps by turning inverters on and off. Other factors to be considered when choosing between the "on/off" and "intermediate power level" embodiments are the optimum operating ranges of the inverters and the capabilities of the inverter control system.

Control of the upward ramp rate of power output as clear sections of sky replace the clouds over the solar facility is implemented because power grids do not perform well when the output of a power source changes rapidly in either direction. Possible approaches for controlling the upward rate of power output whenever an unacceptably steep upward trend begins are:

1) programming each inverter to limit the up-ramp in that inverter's power output in all instances, i.e., control of inverters individually by processors resident in the inverters;
2) using a central control system to sense upward power ramps and coordinate inverters to ensure that the upward ramp is within acceptable limits, and
3) using sensed atmospheric data to anticipate the departure of clouds, predict the resulting increase in irradiation over the solar facility, calculate the output power ramp that the predicted increase in irradiation is likely to produce, determine whether the calculated ramp is unacceptably steep, and, if so, actively control the farm level output to produce an acceptable ramp rate.

The control of inverters in the departure of clouds and increase in power can be done in manners similar to the control of inverters in the anticipation of the arrival of clouds and reduction in power. In this case, a central control system, such as a Supervisory Control And Data Acquisition (SCADA) system, could achieve the ramp at the farm level either by turning inverters from off to on or from on to off or by operating inverters at less than their maximum available power output.

Alternatively, in a system with "smart" inverters, whether or not a control system is included in the inverter network, each inverter could be programmed to ensure that it does exceed certain power ramp requirements. If the DC input power entering the inverter begins increasing at too fast a rate, the inverter can operate off the maximum power point (MPP), for example by increasing voltage and decreasing current, thereby reducing its immediate AC power output to the grid.

As the incoming DC power level stabilizes, the inverter can gradually return to MPP operation and optimum efficiency at a grid-compatible ramp rate.

Deploying Backup Power Sources to Compensate for Weather-Induced Power Fluctuations Onsite or remote power storage may be used to mitigate fluctuations in power output to meet production ramp interconnection requirements. One version of this strategy uses centrally controlled, physically distributed storage. Each array routinely stores power in a battery, flywheel, or other energy storage system. The control system is able to monitor and optimally utilize the stored power in all the energy storage systems, as well as monitoring the solar farm output, from a single control point. Such a system may use sensors and algorithms in order to smooth out rapid fluctuations from cloud passage. The system may also be configured to connect the storage systems to the control system through the network used to control the inverters.

Alternate Generation

There may be entities within the transmission and distribution grid area that have backup generation capacity. If these entities produced energy as the output from the solar farm declined, the combined rate of change of the solar farm and the backup generation could be within target levels.

Control of Load Demand

There may be large energy consumers within the transmission and distribution grid area that could reduce their demand for power as the output from the solar farm declines. The combined rate of change of the solar farm and the large energy consumer could then be kept within target levels. In this manner, communication with users may include communicating with a non-utility partner who would then be able to adjust generation or load demand on the grid.

When the power ramps upward, as when clouds over a solar farm dissipate, some loads could be increased to slow the increase in supply to the grid. For instance, a greater fraction of produced power could be diverted to storage when the upward ramp is too steep.

Notifying Operators of Upcoming Power Fluctuations

Sending communications that notify a utility or grid system operator of upcoming output fluctuations from a solar farm or other power station allows the utility or grid operator to operate flexibly to mitigate the effects of the expected fluctuations on grid stability. This could be achieved by multiple methods including:

1) increasing the number of power plants online and running the power plants at less than full power in order to increase the amount of available upward frequency regulation,
2) increasing the amount of power imported from other control areas and running the in control area power plants at less than full power in order to increase the amount of available upward frequency regulation, or
3) readying large energy consumers to reduce demand.

This communication function could also be used for sharing data between the solar farm and the utility, grid system operator, other solar or wind farms, or other local weather monitoring stations. A central control system could gather data for, and react on behalf of, multiple farms spread across a geographic area similarly affected by weather patterns.

Combined Controls

A combination of solar forecasting, inverter controls, storage or other responses, may be used. The computer program would be used to regulate the power to a certain level using a combination of the various techniques above.

Prediction-Enhanced Supply Flexibility From Weather-Affected Power Stations

Solar and other intermittent resources currently sell energy. As part of a power purchase agreement, any capacity or power value may be sold together with the energy. By combining storage and power control algorithms in a solar power plant, such a plant could function as both intermittent (non-dispatchable) and a dispatchable resource. Software is able to track the energy from the intermittent solar facility separately from the power or regulation services provided by the storage facility. Thus, the operator of a solar farm is able to conveniently sell both the intermittent energy (with its associated capacity value) and the dispatchable regulated power through the same interconnection point. The control system (with or without storage) could also provide ancillary services to the grid, including but not limited to voltage regulation, frequency regulation, power factor correction, load following, and spinning and non-spinning reserve.

Operation

Figure 4:
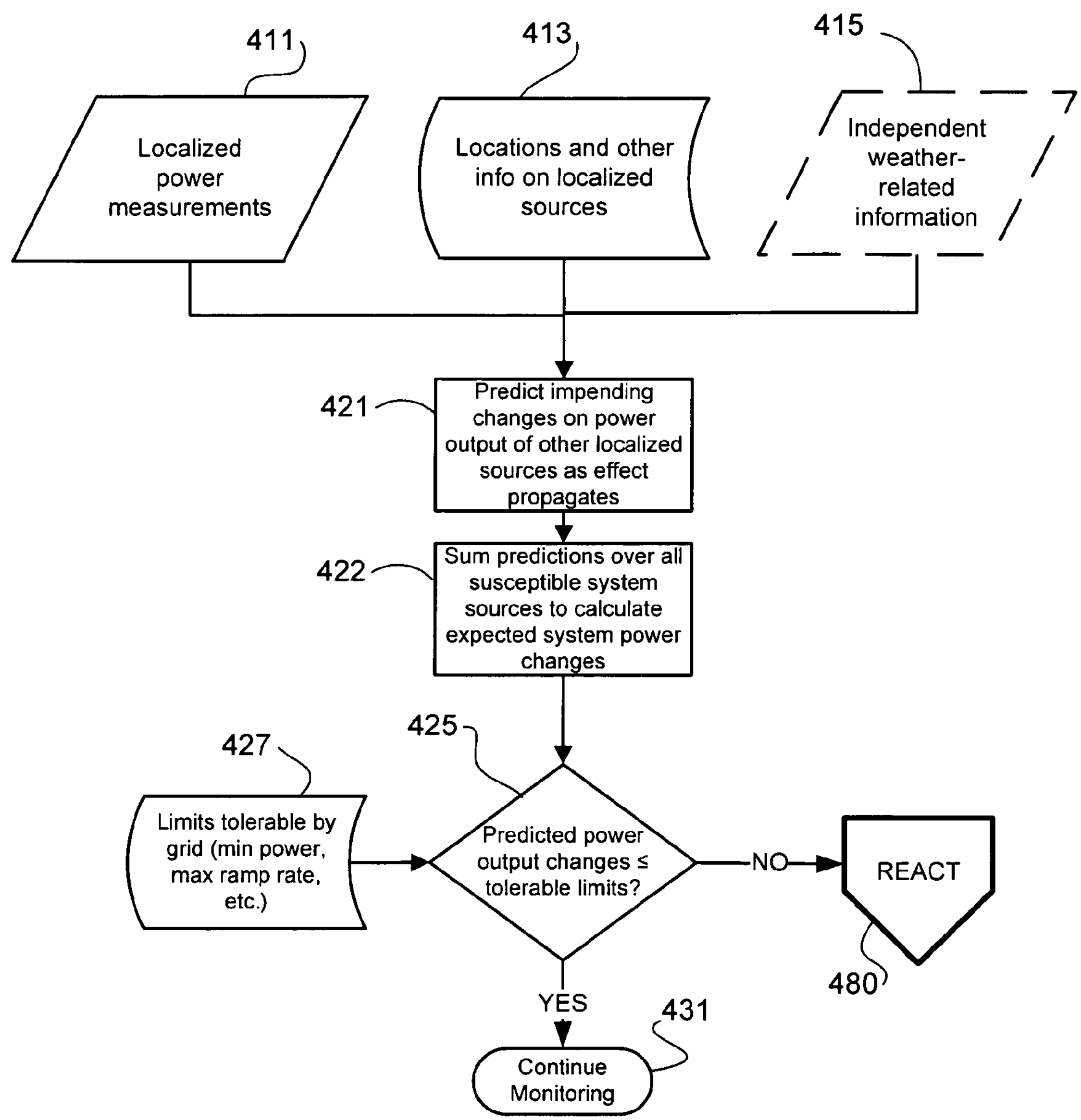
FIG. 4 is a flow diagram showing operation of an example power-tracking system.

FIG. 4 is a flow diagram showing an overview of the basic process of receiving and evaluating measurements. Depicted are predictive factors including localized-source power measurements 411, locations and other relevant information on the localized sources (e.g. age, effects of nearby terrain, relative solar illumination angle vs. time of day and year, library of comparisons of predictions with actual power changes) 413, and, optionally, independent weather-related information 415. The data 411-415 is used to predict impending power-output changes on other localized sources located in the extrapolated path of the measured power fluctuations (step 421). The predictions for all the localized fluctuations are summed to predict impending power-output changes at one or more delivery points where the power from the localized sources is combined and delivered to the grid (step 422). A determination (step 425) is made whether the predicted output changes are less than tolerable limits, which are determined by tolerable limit settings 427, which may be static or dynamic data. In the case of the changes being within tolerable limits, the system continues monitoring (step 431); otherwise, the system issues a “REACT” decision or command (step 480). The “REACT” decision (step 480) provides an indication for the system or an external system on the grid to respond to the predicted output change.

Figure 5:
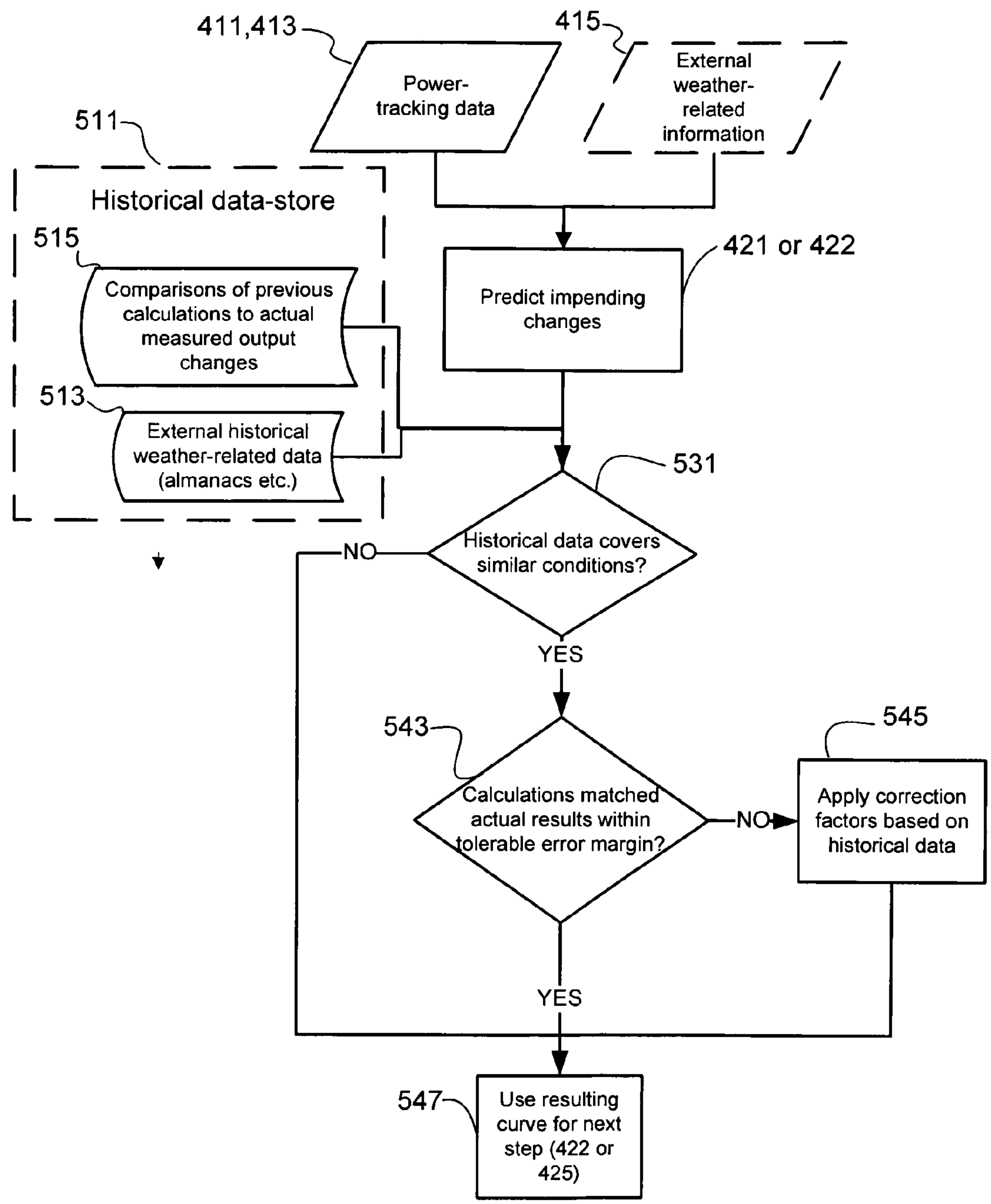
FIG. 5 is a flow diagram showing an enhancement of the process of FIG. 4, in which historically-based correction factors are used.

FIG. 5 is a flow diagram showing an enhancement of the process of FIG. 4, in which historically-based correction factors are used. An historical data store 511 includes external historical weather-related data 513, such as almanac data, and comparisons of previous calculations to actual measured output changes 515. After the initial calculation of an impending power change based on power-tracking data 411, 413 and, optionally, external weather-related information 415, the following steps are taken involving historical data-store 511. This may be done after initially calculating impending power changes to other localized sources, after summing to calculate impending combined power changes at a delivery point, or both.

Data-store 511 is queried to determine whether stored records exist for similar initial calculation results (step 531). If not, the initial calculation is passed to the next step of the process (step 547). If so, the stored records are evaluated to determine whether similar initial calculations accurately predicted actual power output changes (step 543). If so, the initial calculation is passed to the next step of the process (step 547). If not, correction factors are derived from the stored record and applied to the initial calculation to correct it (step 545). The corrected calculation is then passed to the next step of the process (step 547).

Reacting to Predicted Changes

Figure 6:
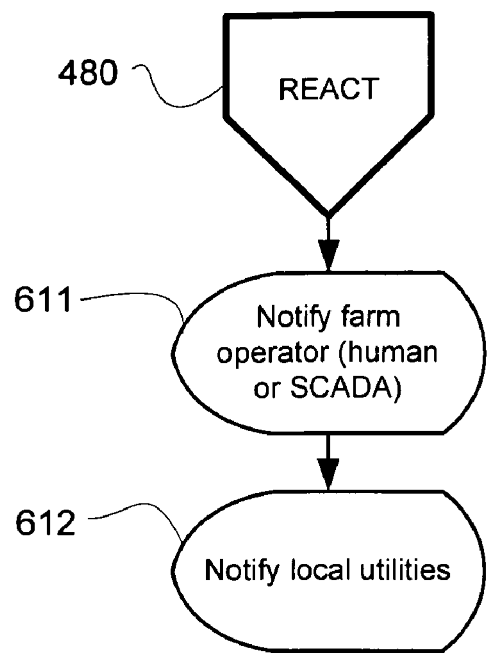
FIG. 6 is a flow diagram depicting reaction steps implemented as grid notification.

FIG. 6 is a flow diagram depicting reaction steps implemented as grid notification. Upon receipt of "REACT" decision 480, a farm operator is notified (step 611) and the farm operator notifies local utilities on the grid (step 612). The farm operator may be human, or alternatively, the farm operator may be a Supervisory Control And Data Acquisition (SCADA) module.

Figure 7:
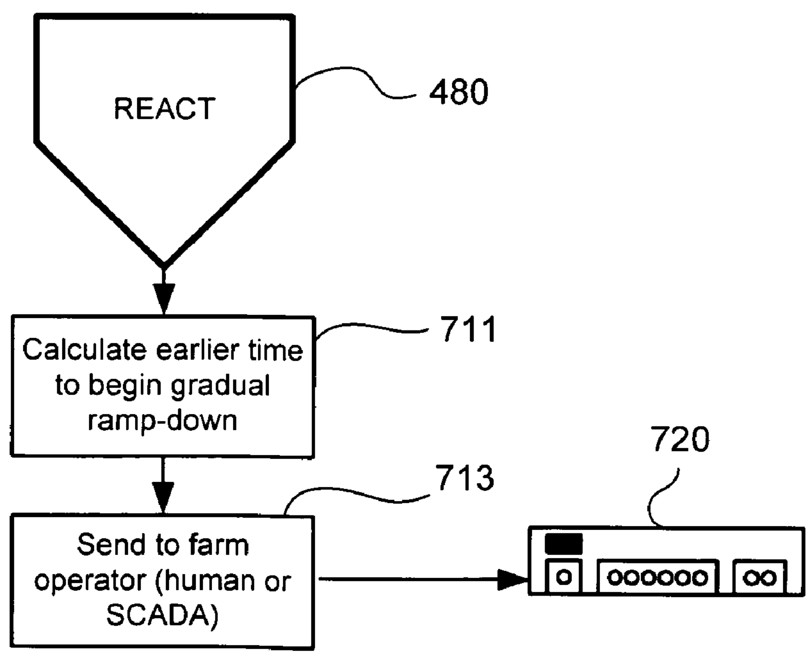
FIG. 7 is a flow diagram depicting reaction steps for controlling ramp-down rate in response to a prediction of reduction in output resulting from cloud passage.

FIG. 7 is a flow diagram depicting reaction steps for controlling ramp-down rate in response to a prediction of an overly rapid reduction in system output. In this procedure, a ramp-down rate that would otherwise exceed the rate of change tolerable by the grid can be kept within tolerable limits if the power loss is predicted in advance. After receiving REACT decision 480, a calculation is made of a time, earlier than the predicted onset of the rapid power decrease to begin an intentional ramp-down of power output (step 711). The earlier start time permits power output to be reduced more gradually than would occur if the system awaited the predicted, externally imposed loss of power. A signal is sent to the operator (step 713), and the operator is able to use the information to initiate the reduction in power output. The operator may be human or may be a Supervisory Control And Data Acquisition (SCADA) system 720 or other computerized system.

Figure 8:
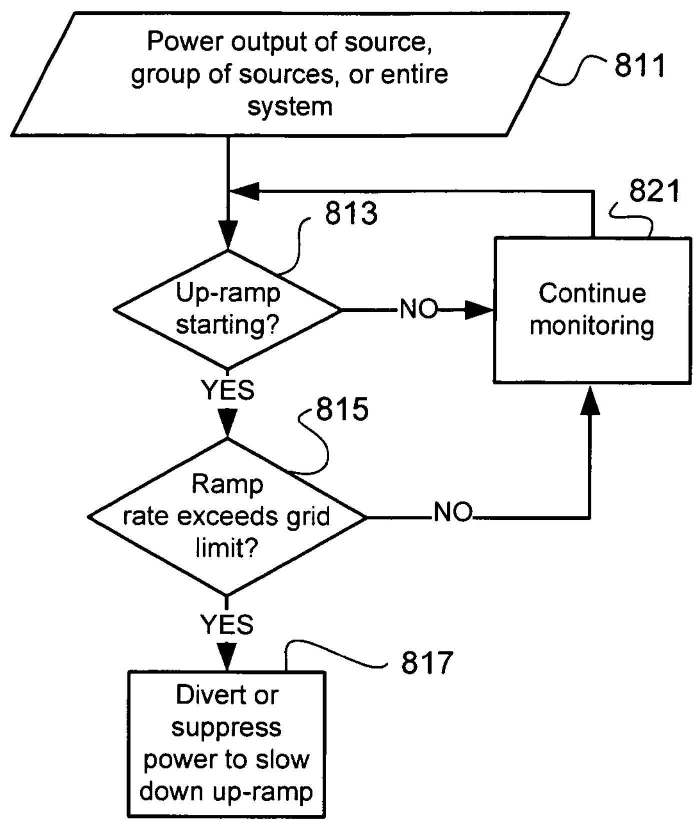
FIG. 8 is a flow diagram depicting a configuration in which sensed power may be used to control upward ramp rate.

FIG. 8 is a flow diagram depicting reaction steps for controlling ramp-up rate in response to either a prediction or an expected possibility of an overly rapid increase in system output. In the example configuration, an up-ramp of power is detected. Local irradiance data, partial power output or total power output is sensed (step 811). A determination (step 813) is made whether an up-ramp event is occurring, and if an up-ramp event is sensed, a determination (step 815) is made as to whether the up-ramp event exceeds a grid limit which may be predetermined or may include a variable tolerance factor provided by the utility. If the up-ramp event is sensed and exceeds the grid limit, then the power output is either suppressed or diverted sufficiently to maintain the rate of power increase 817 within limits as applied to determination 815.

In the event that the up-ramp is not detected (step 813) or the up-ramp does not exceed the grid limit, the system continues to monitor power output (step 821).

Figure 9:
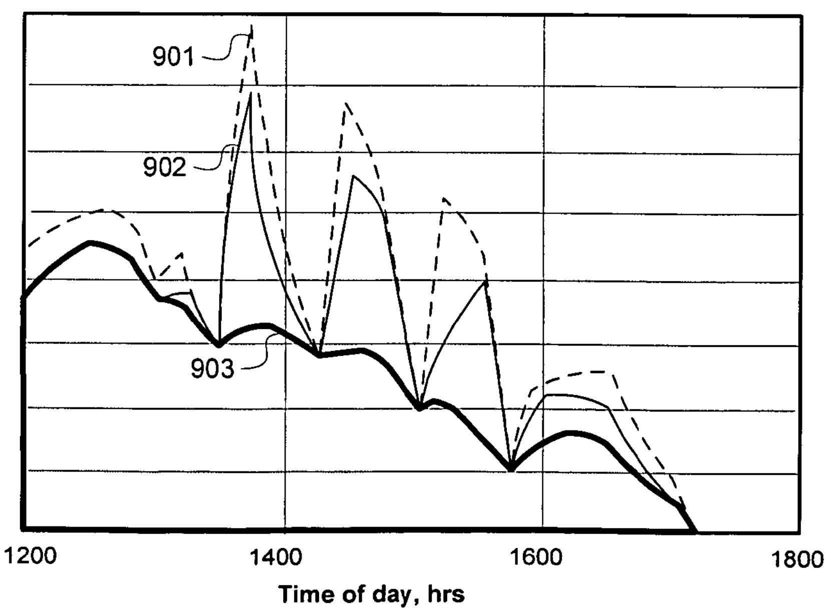
FIG. 9 is an example graph of irradiance, the corresponding expected power changes, and power changes controlled using one or more of the described configurations.

FIG. 9 is an example of a graph contrasting uncontrolled power-output changes with controlled power-output changes from a PV energy source on an afternoon where broken clouds pass over the power station. Irradiance curve 901 has numerous sharp peaks and valleys. The valleys correspond to clouds passing between the sun and the PV panels. The peaks correspond to the spaces between clouds, when more sunlight shines on the PV panels. Note that the overall trend is downward; as the afternoon goes on, the sunlight is incident of the PV panels at angles that become increasingly oblique. The light on the panels also becomes more diffuse because its path length through the scattering atmosphere is longer. PV panels are generally less reactive to oblique or diffuse light than to direct, normally incident light.

Uncontrolled power curve 902 shows what the power station's output would look like as a result of irradiance curve 901 if the station imposed no control over changes or rates of change of its power output. The sharper peaks and valleys could be troublesome if transmitted to the grid. Controlled power curve 903 represents the time-dependent power output that would result from extrapolating curve 902 in advance and reacting by limiting the changes and rates of change in power generation or delivery using some of the methods described here (for example, manipulating the operating points of selected inverters, and/or diverting excess power to storage). This curve reduces the amplitudes and ramp-rates of the power changes to values tolerable by the connected grid.

Figure 10:
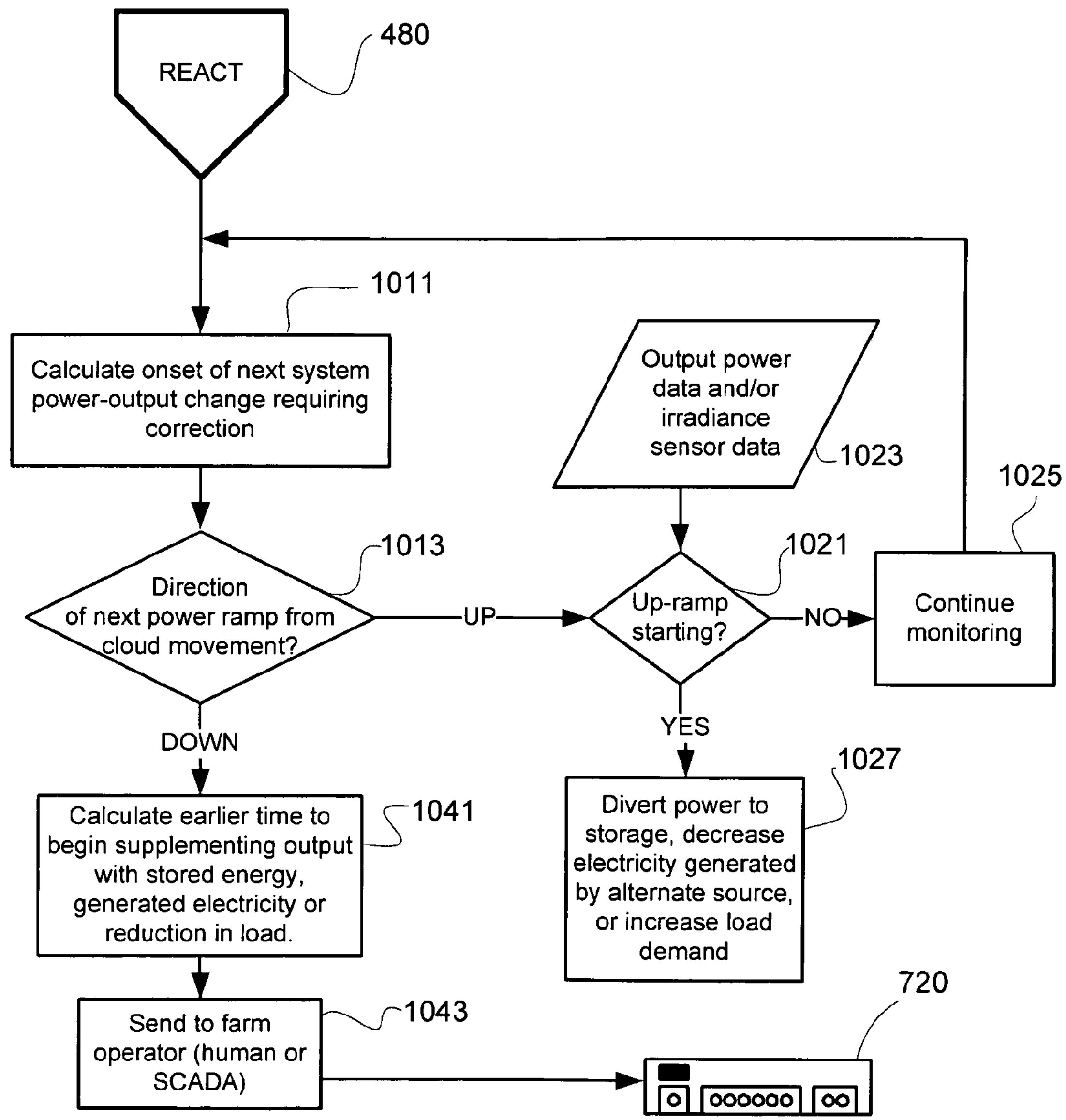
FIG. 10 is a flow diagram depicting alternate reaction steps involving control of backup sources, energy storage, or a controllable load.

FIG. 10 is a flow diagram depicting reaction steps for energy storage, which is similar to the reaction steps for ramp-rate control depicted in FIG. 10. A calculation (step 1011) is made for the onset time of the next system power-output change requiring correction. From calculation 1011, a determination (step 1013) is made of the direction of the associated power ramp.

If the expected power ramp is upward, the system monitors output power, irradiance data from a sensor, or both (1023) to sense when the up-ramp actually begins (step 1021). When the beginning of the up-ramp is detected, the system diverts or suppresses power generation or delivery, or increases the demand of a controllable load to slow the up-ramp rate (step 1027). If storage capacity is available, step 1027 may include diverting power to storage (or, if power is being delivered from storage when the up-ramp begins, ceasing to deliver further power from storage).

If the expected power ramp is determined (at step 1013) to be a downward ramp, a time at or before the calculated onset is chosen to begin supplementing system output power with stored energy or power from a backup source, or to begin reducing a controllable load, to keep the power delivered to the grid within acceptable limits of stability (step 1041). The calculation is sent (1043) to the farm operator. The farm operator may be human, or alternatively, the farm operator may be SCADA module 720 or other computerized system.

Conclusion

Using these techniques, power stations can dynamically respond to weather-related effects that change their output power, thus maintaining the desired stability of power to the grids they supply. With this capability, clean and renewable, but inherently intermittent and weather-sensitive, power sources such as solar and wind farms can mitigate the power output fluctuations that currently make them incompatible with smaller or less-flexible existing power grids. These techniques also enable such sources to sell scheduled power as well as the intermittent energy they normally provide. Further, with these predictive techniques, energy from intermittent and non-intermittent sources could be supplied to a grid through the same interconnection point.

The techniques and modules described herein may be implemented by various means. For example, these techniques may be implemented in hardware, software, or a combination thereof. For a hardware implementation, the processing units within an access point or an access terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in digital storage media, memory units and executed by processors or demodulators. The memory unit may be implemented within the processor or external to the processor, in which case it can be communicatively coupled to the processor via various means.

It will be understood that many additional changes in the details, materials, steps and arrangement of parts, which have been herein described and illustrated to explain the nature of the subject matter, may be made by those skilled in the art within the principle and scope of the invention as expressed in the appended claims.

What is claimed is:

1. A method for controlling a power generation system, the method comprising:

acquiring a real-time measurement of power output from a first weather-sensitive power source in the power generation system;

identifying any time-dependent variations in the measurement of power output that indicate an influence of a geographically propagating condition;

extrapolating an expected power-output change in a second weather-sensitive power source in the power generation system due to continued propagation of the geographically propagating condition, comparing the expected power-output change with a predetermined threshold, and selecting and executing an appropriate response that adjusts the operation of the second weather-sensitive power source or another weather-sensitive power source in the power generation system if the expected power-output change exceeds the predetermined threshold.

2. The method of claim 1, where the extrapolating includes calculating at least one of:

an onset, an amplitude, a rate of change, and a duration of the expected power-output change.

3. The method of claim 1, further comprising combining the expected power-output changes of a plurality of weather-sensitive power sources connected to a supply point to calculate a cumulative expected power-output change for the supply point.

4. The method of claim 1, wherein the geographically propagating condition comprises a weather-related condition capable of affecting power output.

5. The method of claim 4, where the geographically propagating condition comprises one or more of:

a changing solar illumination or solar spectral condition, a changing temperature condition, and a changing wind or ambient-pressure condition.

6. The method of claim 4, where the first and second weather-sensitive power sources comprise at least one photovoltaic module and the extrapolating comprises applying modification factors for at least one of:

characteristics of surrounding terrain, age of the photovoltaic module, solar illumination angle relative to the photovoltaic module as a function of time, and historical information on typical local weather.

7. The method of claim 4, further comprising:

correlating the measurement of power output from the first weather-sensitive power source with an independent weather-factor measurement or forecast, and providing the correlation of the measurement of power output from the first weather-sensitive power source with the independent weather-factor measurement or forecast as an indication of the influence of weather-related conditions .

8. The method of claim 1, where the predetermined threshold represents one or more limits of acceptable power-change aspects, derived from one or more of:

internal or customer specifications, regulatory requirements, demand schedules, limitations of a connected grid, and production targets of scheduled power & intermittent energy.

9. The method of claim 1, where:

the expected power-output change comprises a decrease in output power at a rate exceeding the predetermined threshold, and the appropriate response comprises decreasing the power delivered by the power generating system, beginning in advance of an expected onset of the weather-related decrease, at a rate that does not exceed the predetermined threshold.

10. The method of claim 1, where the expected power-output change comprises an increase in output power at a rate exceeding the predetermined threshold, and the appropriate response comprises slowing the increase in power delivered by the power generating system, beginning when the weather-related increase is sensed, at a rate that does not exceed the predetermined threshold.

11. The method of claim 1, where the appropriate response comprises at least one of:

ceasing power generation or delivery from a selected inverter at a selected time, resuming power generation or delivery from a selected inverter at a selected time, changing the operating point of a selected inverter at a selected time, and using an inverter that automatically senses an increase in input power and responds by limiting an upward rate of change in output power.

12. The method of claim 1, where:

the appropriate response comprises adjusting the power output of the second weather-sensitive power source or another weather-sensitive power source in the power generation system to mitigate an expected power-output change that would otherwise exceed the predetermined threshold, and the adjusting of the power output comprises delivering less than all available power from the adjusted power source;

and further comprising diverting at least some undelivered available power to energy storage.

13. The method of claim 1, further comprising:

measuring an actual power-output change corresponding to the expected power-output change, storing the expected power-output change and the corresponding actual power-output change as records, retrieving a record including a stored expected power-output change similar to a presently extrapolated expected power-output change, generating a set of correction factors based on the correlation between the expected and actual power-output changes in the retrieved record, and applying the set of correction factors to the present extrapolation.

14. The method of claim 1, where the second weather-sensitive power source comprises the first weather-sensitive power source.

15. The method of claim 1, further comprising providing an ancillary service to a power grid connected to the power generating system, where the ancillary service comprises power factor correction.

16. A programmed non-transitory storage medium containing instructions and data for controlling a power system, the instructions and data comprising:

instructions for acquiring a measurement related to real-time power output from a first weather-sensitive power source in the power system;

instructions for identifying any time-dependent variations in the measurement that indicate an influence of a geographically propagating condition;

instructions for extrapolating an expected power-output change due to continued propagation of the geographically propagating condition, instructions for comparing the expected power-output change with a predetermined threshold and instructions for selecting and executing an appropriate response that adjusts the operation of a second weather-sensitive power source in the power system if the expected power-output change exceeds the predetermined threshold.

17. The programmed non-transitory storage medium of claim 16, further comprising instructions for identifying the influence of a weather-related geographically propagating condition by correlating the acquired measurement with an independent measurement or forecast of a weather-related factor.

18. The programmed non-transitory storage medium of claim 16, further comprising instructions for calculating at least one of an onset, amplitude, rate of change, and duration of the expected power-output change.

19. The programmed non-transitory storage medium of claim 18, further comprising instructions for combining the extrapolations for a plurality of power sources on a common time axis to calculate a net expected power change at a supply point connected to the plurality of power sources.

20. The programmed non-transitory storage medium of claim 16, further comprising data related to at least one of characteristics of surrounding terrain, age of a photovoltaic module, solar illumination angle relative to the photovoltaic module as a function of time, and historical information on typical local weather.

21. The programmed non-transitory storage medium of claim 16, where the appropriate responses includes adjusting the power output of the second power source to mitigate aspects of an expected power-output change that exceeds the predetermined threshold.

22. The programmed non-transitory storage medium of claim 21, further comprising instructions for adjusting the power output by controlling at least one selected inverter to do at least one of:

ceasing or resuming power generation or delivery, and changing the inverter operating point to increase or decrease generated power.

23. The programmed non-transitory storage medium of claim 21, further comprising instructions for an inverter to automatically limit a rate of increase in power generation or delivery to a predetermined acceptable ramp-rate when the inverter senses an increase in power input.

24. The programmed non-transitory storage medium of claim 16, further comprising:

instructions for recording an actual power-output change corresponding to the expected power-output change and storing the pair of power-output changes in a record, instructions for retrieving a record that includes a stored expected power-output change similar to a presently extrapolated expected power-output change, instructions for generating a set of correction factors based on the correlation between the expected and actual power-output changes in the retrieved record, and instructions for applying the set of correction factors to the present extrapolation.

25. The programmed non-transitory storage medium of claim 24, where the second weather-sensitive power source comprises the first weather-sensitive power source.

26. The programmed non-transitory storage medium of claim 16, further comprising instructions for providing an ancillary service to a power grid connected to the power generating system, where the ancillary service comprises power factor correction.

27. An apparatus for controlling a power generating system, comprising:

means for acquiring a measurement of power output from a weather-sensitive power source in the power generation system, means for identifying any time-dependent variations in the measurement that indicate an influence of a geographically propagating condition;

means for extrapolating an expected power-output change due to continued propagation of the geographically propagating condition, means for comparing the expected power-output change with a predetermined threshold, and means for selecting and executing an appropriate response that adjusts the operation of a second weather-sensitive power source in the power system if the expected power-output change exceeds the predetermined threshold.

28. The apparatus of claim 27, further comprising:

means for measuring output power from a plurality of geographically separate solar panels in real time, means for calculating a rate of change of the output power for each of the plurality of geographically separate solar panels, means for accessing location data for each of the plurality of geographically separate solar panels, and means for extrapolating a future expected change and a future expected rate of change in output power for solar panels at other locations from results of the measuring, calculating, and accessing operations.

* * * * *